Feb. 14, 1956 A. A. COSTER 2,734,388

VARIABLE SPEED DEVICE

Filed Nov. 14, 1951 2 Sheets-Sheet 1

INVENTOR.
Allan A. Coster

Feb. 14, 1956 A. A. COSTER 2,734,388

VARIABLE SPEED DEVICE

Filed Nov. 14, 1951 2 Sheets-Sheet 2

INVENTOR.
ALLAN A. COSTER
BY
Ervin B. Steinberg
AGENT.

United States Patent Office 2,734,388

Patented Feb. 14, 1956

2,734,388

VARIABLE SPEED DEVICE

Allan A. Coster, Lewisboro, N. Y., assignor to The Reflectone Corporation, a corporation of Connecticut Application November 14, 1951, Serial No. 256,294

7 Claims. (Cl. 74—198)

The present invention relates to variable speed devices employing the disk, ball and roller principle and has particular reference to the construction of devices in which a plurality of rollers is driven from a single rotating disk.

The basic principle of using a rotating disk and one or more rollers in cooperation with a set of balls located at various positions of radial displacement from the center of said disk to obtain speed variations is old in the art. This device is particularly useful in such instruments as fire control directors, target motion generators and analog computers in which a rate vector is continuously and instantaneously resolved into its cartesian coordinate vectors. In such a device, for instance, the disk rotates at a certain velocity representing the magnitude of the speed vector ds/dt. By means of two individual sets of balls and two individual rollers this rate vector is resolved into its cartesian coordinates $dx/dt=(ds/dt)\cos\theta$, and $dy/dt=(ds/dt)\sin\theta$, whereby angle $\theta$ represents the direction of the vector. Mechanically this is accomplished by the use of a sine-cosine resolving mechanism, such as the "Scotch Yoke," which selectively displaces each set of balls along the radial axis of said disk so that the roller associated with each set of balls revolves at a speed corresponding to the above cartesian relationship. It is, of course, of importance that each set of balls is in constant engagement with the disk and its associated roller in order that no slip occurs among the two sets of balls, the disk and their associated rollers, as even the slightest amount of slippage would cause an error in the mathematical result thus obtained.

In the prior art it has been a general practice to mount the two rollers along a common axis in a plane parallel to the active surface of the rotating disk, each roller being journaled at a point near the center and at a point near the periphery of the disk. Each set of balls disposed between one of the rollers and the disk is selectively positioned for reciprocating movement across the face of the disk. In order to obtain the proper contact pressure between each roller, its associated set of balls and the single disk, this disk is usually spring mounted for movement in axial direction to exert pressure on to the set of balls and the rollers.

It is apparent that there must be perfect parallelism between the common axis of the rollers and the radial, active surface of the disk in order that each set of balls obtains an appropriate amount of contact pressure. Since in the mechanical assembly this theoretical occuracy is unobtainable, the disk is mounted with some slight amount of play of the shaft bearings thereby obtaining a self-alining feature. This play, although a mechanical necessity, causes a wabbling motion of the rotating disk and the non-circular path generated thereby affects the accuracy of the device. Furthermore, it is obvious that if one set of balls is positioned rear the center of the disk and the other set of balls near the periphery of the disk it is almost impossible to obtain an equal or nearly equal contact pressure distribution between the two sets of balls. The set of balls located near the center usually obtains the entire amount of contact pressure while the set of balls positioned near the periphery obtains very little contact pressure and the operation of the roller associated therewith becomes erratic and unreliable. Moreover, the life of this type of variable speed device is determined to a great extent by the life of the balls. Too high a contact pressure causes excessive plastic deformation followed by fatigue of the balls. On the other hand with too low a contact pressure there is insufficient torque transmission, excessive slippage and wear of the balls.

One of the objectives of this invention is to provide an improved roller mounting which avoids one or more of the disadvantages and limitations of prior art arrangements.

Another objective of this invention is to avoid the necessity of close tolerances and accurate alinement.

A further important objective of the invention is to provide accurate control of the contact pressure between disk, the set of balls and the associated roller thereby obtaining improved performance and longer life.

Still another object of the invention is the provision of separate adjusting means for each roller thereby rendering each roller independent of the effects of settings on adjacent rollers.

With these and other objectives in view the invention comprises a rotatbale disk, a plurality of rollers spaced from and parallel to the disk, and a set of balls disposed between said disk and each roller. Each roller is equipped with individually adjustable spring means to effect an accurate control of the contact pressure between the roller, its associated set of balls and the disk in order that the contact pressure will not vary with the radial position of the set of balls. Also the radial position of one set of balls will have no influence upon the contact pressure between the other set of balls, its associated roller and disk.

For a better understanding of the present invention together with other and further objects thereof, reference is made to the following description taken in connection with the accompanying drawings, in which.

Figures 1, 2:
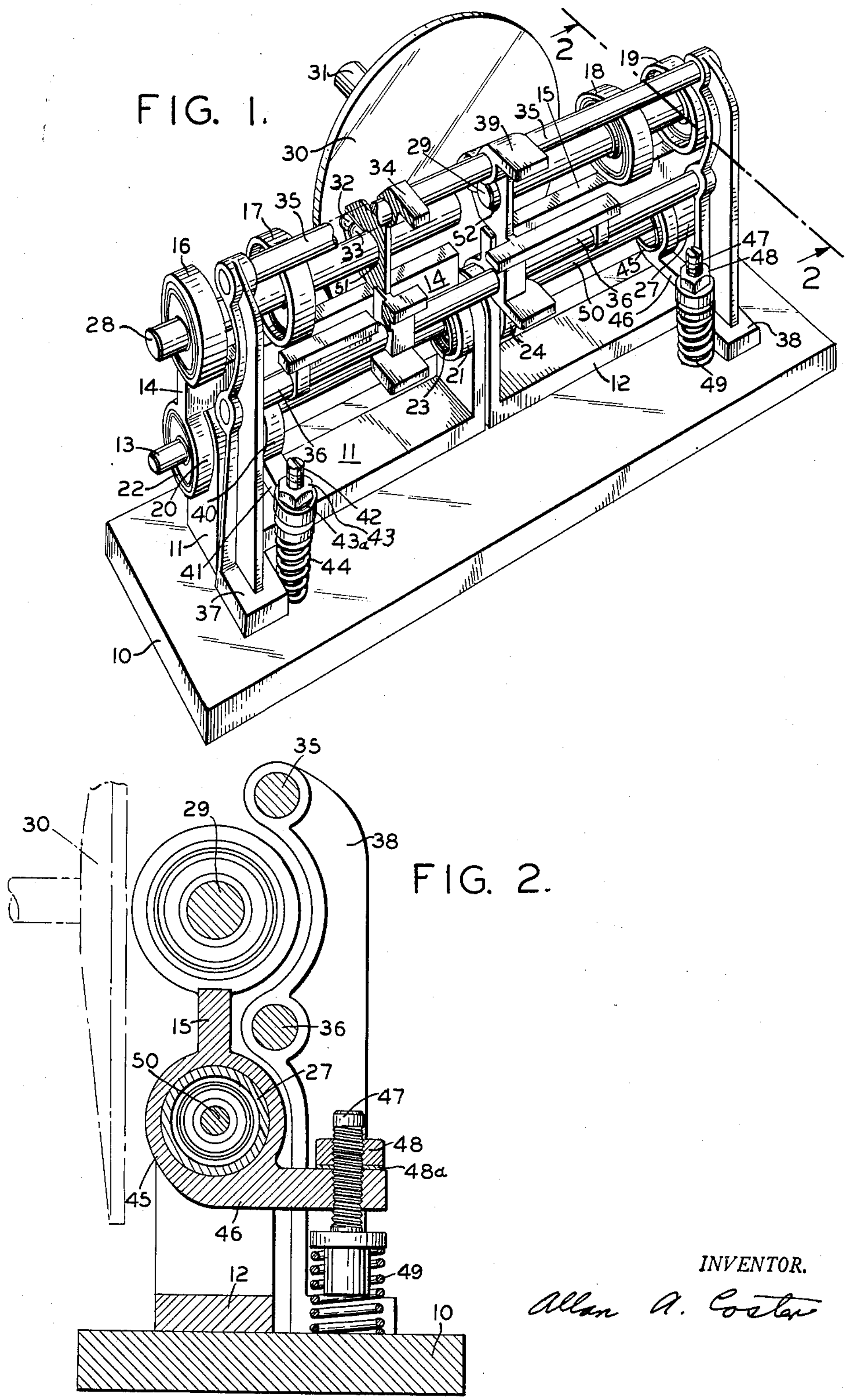
Figure 1 is a perspective view, partly in section, of the variable speed device.
Figure 2 is a sectional view at the plane 2—2.

Referring to Figures 1 and 2, base plate 10 supports two base brackets 11 and 12. A shaft 13 passes through base bracket 11 and also holds pivotally suspended therefrom upright roller bracket 14. Correspondingly, on the opposite side a shaft 50 passes through base bracket 12 and holds pivotally suspended therefrom upright roller bracket 15. Shaft 13 and shaft 50 terminate near the the inner, opposing ends of base bracket 11 and 12 respectively, and are individually rotatable. Roller bracket 14 is equipped with two bearing housings 16 and 17 respectively, and on the corresponding opposite side, roller bracket 15 is equipped with bearing housing 18 and bearing housing 19. Each of these bearing housings is fitted with anti-friction bearings such as are well known in the art. Attached to roller bracket 14 are two further annularly shaped bearing housings 20 and 21 respectively, each of which contains an annular sleeve bearing 22 and 23 respectively. In a similar manner, roller bracket 15 is equipped with two further annular bearing housings, namely housing 24 and another bearing housing (not visible), each of which is equipped with an annular sleeve bearing, namely a sleeve bearing (not visible) in bearing housing 24 and sleeve bearing 27.

Shaft 13 is held concentrically aligned with respect to bearing housings 20 and 21 by means of suitable anti-friction bearings which are interposed between shaft 13 and the annular sleeve bearings 22 and 23. Similarly shaft 50 is held concentrically alined with respect to bearing housing 24 and the other housing (not visible) by means of suitable anti-friction bearings which are interposed between shaft 50 and sleeve bearing 27 and interposed between shaft 50 and a sleeve bearing (not visible) contained in bearing housing 24.

A roller 28 is cantilever-like supported by bearing housings 16 and 17 respectively, which are attached to roller bracket 14. Correspondingly, roller 29 is cantilever-like supported by bearing housings 18 and 19 respectively, which are attached to roller bracket 15. The inner, radially opposing, ends of roller 28 and roller 29 are separated by a suitable air space in order that each roller may rotate at a speed and direction of rotation independent of the other roller.

Rotating disk 30, equipped with shaft 31, is spaced from roller 28 and roller 29 and located in a plane substantially parallel to the axis of rotation of rollers 28 and 29 respectively. The disk 30, furthermore, is centered with respect to both rollers. A set of balls consisting of ball 32 and ball 33 is disposed between roller 28 and rotating disk 30, the balls being in intimate frictional contact with each other as well as with disk 30 and roller 28. In a similar manner, a set of balls (not visible) is interposed between disk 30 and roller 29. Rotation of disk 30 therefore is transmitted from ball 32 over ball 33 to roller 28, and in a similar manner rotation of disk 30 is transmitted by the other set of balls to roller 29. Both rollers rotate in opposite direction.

Slide 34 housing a set of balls, ball 32 and ball 33 respectively, may be slidably positioned in a radial direction along guide rods 35 and 36, which are suspended in guide rod supports 37 and 38 extending from base plate 10. In a similar manner, slide 39 may perform a reciprocating movement along the radial axis of disk 30 by sliding along guide rod 35 and guide rod 36. The aperture 51 of slide 34 is of a somewhat larger diameter than the diameter of roller 28 in order that roller 28 may move independently of slide 34. Similarly aperture 52 of slide 39 is larger than the diameter of roller 29.

The position of each slide, slide 34 and slide 39 respectively, may be varied from a point near the periphery of the disk to a point near the center of rotation of disk 30. It is obvious that the radial position of each slide housing a set of balls determines the rotational speed of the associated roller. If the slide is positioned near the center of rotation of the disk, the associated roller revolves at low speed; if the slide is near the periphery, the associated roller revolves at high speed.

As it is important that there is proper contact pressure between disk 30, roller 28 and its associated set of balls, ball 32 and ball 33 respectively, and between disk 30, roller 29 and its associated set of balls, separate adjusting means for each roller have been provided. Annular housing 40 attached to roller bracket 14 and rotatably attached to sleeve bearing 22, is equipped with a lip 41. Adjusting screw 42 being threaded through lip 41 with locking nut 43 and washer **43*a* receives pressure exerted by spring 44 confined between the base plate 10 and the lower end of adjusting screw 42. This spring pressure causes roller bracket 14, by means of housing 40 and lip 41 attached thereto, to pivot about the axis of shaft 13 thereby urging roller 28 into intimate contact with ball 33, ball 32 and disk 30. In a similar manner roller 29 is urged toward disk 30 by the combination of spring 49, adjusting screw 47 with locking nut 48 and washer 48*a*, which causes roller bracket 15 with housing 45 and lip 46 to rotate about the axis of shaft 50. Roller 29 thereby exerts engagement pressure between its set of balls and the disk 30. By selectively adjusting the radial position of slide 34 and slide 39, differing output speeds on rollers 28 and 29 respectively, may be obtained from the single input speed of disk 30**.

Power take-off means may be attached either directly to roller 28 and roller 29 or power from roller 28 may be transferred to shaft 13 and from roller 29 to shaft 50 by means of a set of matching gears. As roller 28 pivots about shaft 13 and roller 29 pivots about shaft 50, the pitch relationship between a set of matching gears will remain constant irrespective of the radial motion of the roller with reference to its pivoting axis.

Figure 3:
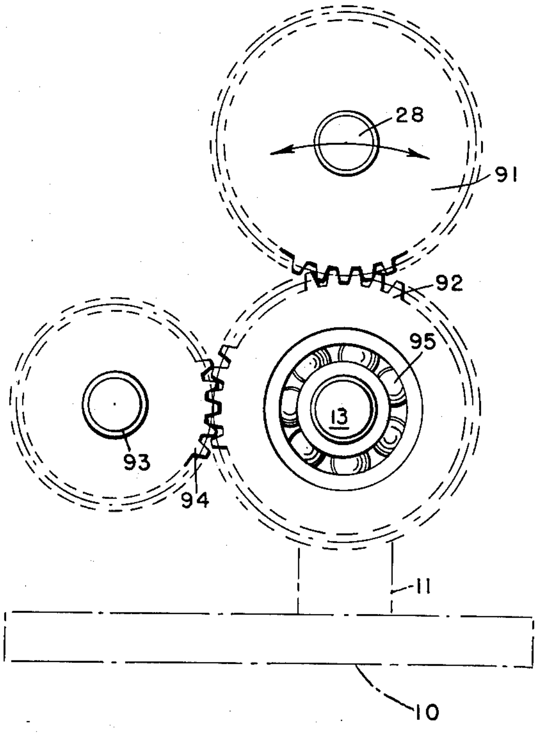
Figure 3 is an end vew showing typical power transfer means from the variable speed device.

Such an arrangement is illustrated in Figure 3 wherein roller 28 is equipped with a gear 91 which meshes with a gear 92 supported on shaft 13 and moving freely with respect thereto by virtue of a ball bearing 95. Gear 92 meshes also with gear 94 attached to shaft 93. Roller 28 pivotally mounted with respect to the axis of shaft 13 as indicated by the arrow transmits its rotation of shaft 93 which is fixed in space and which serves as input shaft for the mechanism operating in response to the variable speed obtained.

The advantages of this construction should be at once apparent. Each roller is equipped with independent pressure adjusting means to selectively regulate and control the contact pressure between the rotating disk, each roller and its associated set of balls. This contact pressure, if necessary, may be selectively varied in accordance with changing torque requirements. Furthermore, in the mechanical assembly it is almost impossible to have both rollers alined not only on a common axis of rotation, but also in true parallelism with the rotating disk surface. In the foregoing construction, each roller is mounted with sufficient flexibility to compensate for unavoidable mechanical variations, always retaining frictional engagement between the associated set of balls and disk. Also, the pressure between each roller, its associated set of balls and the disk will remain for all practical purposes constant when the slides assume various positions along their radial excursion paths. Associated with this feature, the radial position of one slide will have no bearing upon the contact pressure between the disk and balls of a neighboring roller.

While there have been described and illustrated specific embodiments of the invention, it will be obvious that various changes and modifications may be made therein without departing from the field of the invention which should be limited only by the scope of the appended claims.

What is claimed is:

1. A variable speed device comprising a rotatable disk, a plurality of rollers spaced from and substantially parallel to said disk, a ball housing disposed between each of said rollers and said disk, a spherical transmitting member confined in each of said ball housings, resilient means acting on said rollers causing contact pressure between each roller and spherical transmitting member and said disk respectively, and means to vary the radial position of each ball housing with respect to said disk.

2. A variable speed device comprising a rotatable disk, a plurality of power transmitting rollers simultaneously operable spaced from and substantially parallel to said disk, a ball housing disposed between each of said rollers and said disk, a set of balls confined in each of said ball housings, the balls of each set in contact with one another and with one of said rollers and the disk respectively, means to selectively vary the pressure between each of said rollers, set of balls and disk, and means to selectively vary the radial position of each ball housing.

3. A variable speed device comprising a rotatable disk, a shaft extending from said disk, a plurality of rollers spaced from and substantially parallel to said disk, a ball housing disposed between each of said rollers and said disk, a set of balls confined within each of said ball housings, the balls of each set in contact with one another and with one of said rollers and said disk respectively, the common axis of each set of balls being substantially parallel at all times with the axis of said disk shaft and intersecting the axis of rotation of the roller associated with the respective set of balls, means to selectively vary the radial position of each ball housing, and means to selectively vary the pressure between each of said rollers, set of balls and disk.

4. A variable speed device comprising a single rotatable disk, a plurality of cantilevered rollers for simultaneous transmission of power spaced from and substantially parallel to said disk, a ball housing associated with and disposed between each of said rollers and said single disk, a set of balls confined within each of said ball housings and the balls within each housing in contact with one another and with the disk and the associated roller respectively, means to selectively vary the radial position of each ball housing, and spring means to selectively vary the pressure between each of said rollers, set of associated balls and the single disk.

5. A variable speed device comprising a single rotatable disk, a plurality of power transmitting pivotally mounted rollers spaced from and substantially parallel to said disk, the partial length of each roller facing said disk being shorter than the diameter of said disk, a ball housing disposed between each of said rollers and said disk, a plurality of balls confined within each of said ball housings, the balls within each housing in contact with one another and with the disk and the roller associated with the housing respectively, resilient means to selectively vary the contact pressure between each roller, balls and said single disk, and means to selectively vary the radial position of each ball housing.

6. A variable speed device comprising a rotatable disk; a plurality of simultaneously operable power transmitting rollers spaced from and substantially parallel to said disk; each roller individually hinge mounted for movement in a plane substantially perpendicular to the face of the disk; a ball housing disposed between said disk and each of said rollers; a set of balls confined within each of said ball housings; the balls within each housing contacting one another, said disk and the roller associated with that housing respectively; means to selectively vary the radial position of each ball housing; and resilient means to selectively adjust the distance of each roller with respect to said disk to assure uniform contact pressure between each roller, balls and disk.

7. A variable speed device comprising a rotatable disk; a plurality of rollers spaced from and substantially parallel to said disk; a pivoting shaft spaced from said rollers and located in a plane substantially parallel to the disk; said rollers pivotally mounted from said shaft for movement in a plane substantially perpendicular to the face of said disk; a ball housing disposed between said disk and each of said rollers; a set of balls confined within each of said ball housings; the balls within each housing contacting one another, said disk and the roller associated with that housing respectively; means to selectively vary the radial position of said ball housings; resilient means to selectively vary the contact pressure between each roller, balls and said disk; and power transmitting means between said rollers and said pivoting shaft.

References Cited in the file of this patent

UNITED STATES PATENTS

| | | |
|---|---|---|
| 1,317,916 | Ford | Oct. 7, 1919 |
| 2,059,423 | Weiss | Nov. 3, 1936 |
| 2,359,132 | Libman | Sept. 26, 1944 |

FOREIGN PATENTS

| | | |
|---|---|---|
| 130,163 | Great Britain | July 28, 1919 |
| 579,850 | Great Britain | Aug. 19, 1946 |